(12) United States Patent
Schwarzbich

(10) Patent No.: US 9,775,217 B2
(45) Date of Patent: Sep. 26, 2017

(54) HAND-HELD LIGHTING DEVICE

(71) Applicant: Jörg Schwarzbich, Bielefeld (DE)

(72) Inventor: Jörg Schwarzbich, Bielefeld (DE)

( * ) Notice: Subject to any disclaimer, the term of this patent is extended or adjusted under 35 U.S.C. 154(b) by 0 days.

(21) Appl. No.: 15/129,937

(22) PCT Filed: Apr. 2, 2015

(86) PCT No.: PCT/EP2015/057307
§ 371 (c)(1),
(2) Date: Sep. 28, 2016

(87) PCT Pub. No.: WO2015/155114
PCT Pub. Date: Oct. 15, 2015

(65) Prior Publication Data
US 2017/0156194 A1    Jun. 1, 2017

(30) Foreign Application Priority Data

Apr. 11, 2014    (DE) .................. 20 2014 101 734 U

(51) Int. Cl.
*H05B 37/02*    (2006.01)
*F21V 23/04*    (2006.01)
(Continued)

(52) U.S. Cl.
CPC ......... *H05B 37/0236* (2013.01); *A45C 13/24* (2013.01); *A45C 15/00* (2013.01); *A45C 15/06* (2013.01); *F21L 4/00* (2013.01); *F21V 23/0414* (2013.01); *G10L 13/08* (2013.01); *G10L 15/08* (2013.01); *G10L 15/22* (2013.01); *G10L 2015/088* (2013.01); *G10L 2015/223* (2013.01)

(58) Field of Classification Search
CPC ............ H05B 33/0815; H05B 41/2828; H05B 37/0236; H05B 39/041; H05B 37/02; F21L 4/00; F21V 23/0414; F21V 23/0442; G10L 13/08; G10L 15/08; G10L 15/22; G10L 2015/088; G10L 2015/223; G10L 15/26; G10L 13/00; G10L 15/20; G10L 25/78
See application file for complete search history.

(56) References Cited

U.S. PATENT DOCUMENTS 4,972,304 A * 11/1990 Ylla .................. A45C 15/06
                                                    362/156
6,265,984 B1    7/2001 Molinaroli
(Continued)

FOREIGN PATENT DOCUMENTS

CN    201547528 U    8/2010
CN    203289721 U    11/2013
(Continued)

OTHER PUBLICATIONS

Seer.    www.thinkcreate.org/index.php/google-glass-controlled-flashlight/. Dec. 5, 2013.
(Continued)

*Primary Examiner* — Vibol Tan
(74) *Attorney, Agent, or Firm* — Richard M. Goldberg

(57) ABSTRACT

A hand-held lighting device includes a light source (18) and a switching device (26) for switching the light source on and off, and the switching device (26) includes a speech processor (34) for analyzing and/or synthesis of the spoken speech.

12 Claims, 1 Drawing Sheet

(51) Int. Cl.
  *G10L 15/22* (2006.01)
  *G10L 13/08* (2013.01)
  *G10L 15/08* (2006.01)
  *F21L 4/00* (2006.01)
  *A45C 15/00* (2006.01)
  *A45C 15/06* (2006.01)
  *A45C 13/24* (2006.01)

(56) References Cited

U.S. PATENT DOCUMENTS

| | | | | |
|---|---|---|---|---|
| 6,900,735 B2 * | 5/2005 | Guerrieri | ........... | H05B 37/0209 340/321 |
| 7,031,920 B2 * | 4/2006 | Dowling | ............ | H05B 37/0236 704/270 |
| 7,291,940 B2 * | 11/2007 | Bruwer | ................ | H01H 13/063 307/137 |
| 7,418,392 B1 * | 8/2008 | Mozer | .................... | G10L 15/26 315/307 |
| 2002/0084890 A1 | 7/2002 | Guerrieri et al. | | |
| 2004/0264187 A1 * | 12/2004 | Vanderschuit | .......... | F21S 6/005 362/235 |
| 2006/0227538 A1 | 10/2006 | Williams | | |
| 2007/0259594 A1 | 11/2007 | Galbiati et al. | | |
| 2010/0053941 A1 * | 3/2010 | Ibison | .................... | A45C 15/06 362/155 |
| 2011/0204818 A1 * | 8/2011 | Spartano | ............ | H05B 37/0209 315/294 |

FOREIGN PATENT DOCUMENTS

| | | |
|---|---|---|
| CN | 203463953 U | 3/2014 |
| DE | 19925064 A1 | 3/2000 |
| DE | 102010044320 B4 | 3/2012 |
| EP | 0958756 A1 | 11/1999 |
| WO | 02/11497 A1 | 2/2002 |
| WO | 2013/076606 A1 | 5/2013 |

OTHER PUBLICATIONS

C.S. Magor. www.uberreview.com/2010/11/let-there-be-nerdy-light-from-voice-activated-flashlight-wands.htm. Nov. 19, 2010.

* cited by examiner

HAND-HELD LIGHTING DEVICE

BACKGROUND OF THE INVENTION

The invention relates to a hand-held lighting device comprising a light source and a switching device for switching the light source on and off.

More particularly, the invention relates to a hand bag light which serves for illuminating the interior of a container such as a hand bag. EP 0 958 756 A and DE 10 2010 044 320 B4 describe lighting devices of this type wherein the switching device responds to the signal of a touch sensor or proximity sensor. When the user puts her hand into the open hand bag in order to search for articles accommodated therein and then touches the lighting device, the light source is switched on automatically so as to illuminate the interior of the hand bag.

It is also known to switch off the lighting device by means of another sensor which detects the open/close condition of the container and assures that the light source is switched off automatically when the container is closed again.

SUMMARY OF THE INVENTION

It is an object of the invention to enhance the functionality of such a lighting device.

In order to achieve this object, the switching device comprises a speech processor for analysis and/or synthesis of spoken speech.

The light source may then be switched on—and may also be switched off again, as the case may be, simply by speaking a suitable code word. The "dictionary" of the speech processor needs to comprise only one or a few words, so that the processing capacity and programming effort required for the speech processor may be low.

In particular, the invention makes the lighting device attractive as an advertising medium or advertising gift, because the code word may for example be the company name or a trademark of the advertiser. The effectiveness of the advertising may be enhanced further by the design of the lighting device. For example, if the code word is a blind of a sports car, the lighting device may be designed as a model of this sports car.

In another embodiment the speech processor may also be used for generating a short spoken text when the lighting device is activated or deactivated, wherein the activation and deactivation may optionally be achieved in the conventional way by means of a touch sensor or the like.

If both embodiments are combined, a short spoken (dialogue) between the user and the lighting device is also possible.

Useful details and further developments of the invention are indicated in the dependent claims.

BRIEF DESCRIPTION OF THE DRAWINGS

Embodiment examples will now be described in conjunction with the drawings, wherein.

DETAILED DESCRIPTION

Figure 1:
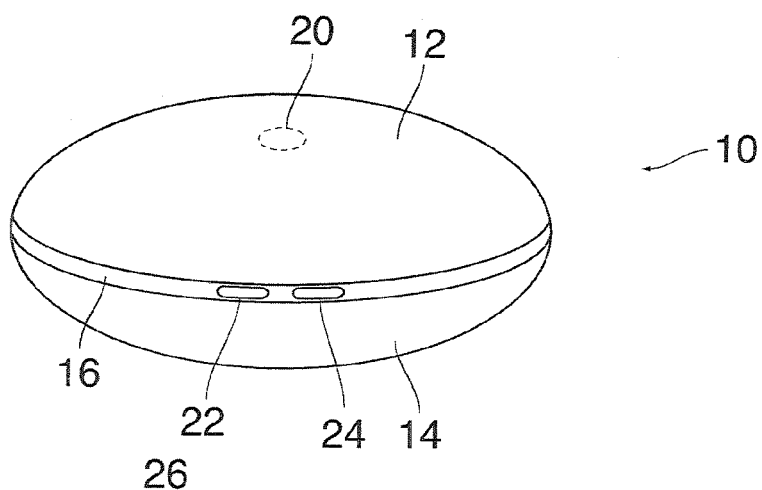
FIG. 1 is a view of a lighting device according to the invention.
Figure 2:
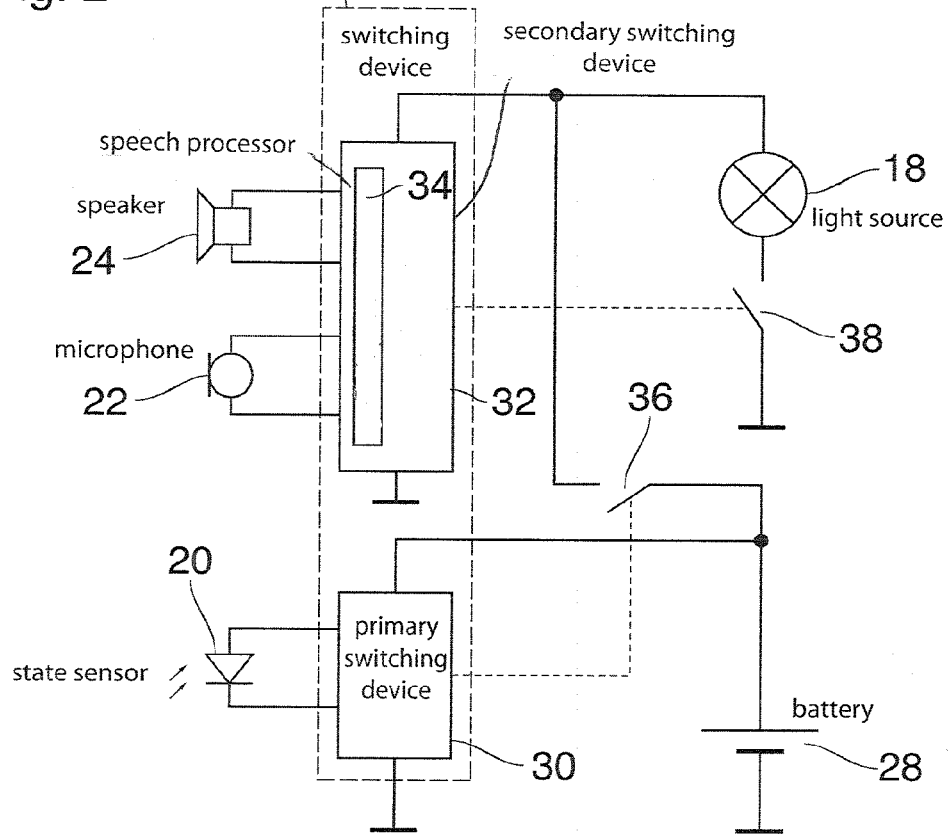
FIG. 2 is a simplified circuit diagram of the lighting device.

The lighting device shown in FIG. 1 has an oval or disk shaped casing 10 formed by two half shells 12, 14 which are held together by a frame 16. The outer surfaces of the half shells 12, 14 or configured as luminescent screens and therefore constitute a light source 18 which has been shown in simplified fashion as a circuit symbol in FIG. 2. The luminescent screens may for example be formed by a fine raster of LEDs behind a translucent light-diffusing protective layer.

In the example shown, at least one state sensor 20 is accommodated in the casing 10, the sensor having the purpose to detect the open/close condition of a container such as a hand bag, which has not been shown and in which the lighting device is normally carried. In the example shown, the state sensor 20 is an environment light sensor which detects the light that enters into the bag when it is open.

A microphone 22 and an allowed speaker 24 are arranged in the frame 16 of the casing 10. Further, the casing 10 contains an electronic switching device 26 and a battery 28 which have only been shown in the circuit diagram in FIG. 2.

The switching device 26 comprises a primary switching device 30 which is continuously supplied with power from the battery 28 and response to the signal from the state sensor 20, as well as a secondary switching device 32 which includes a speech processor 34 connected to the microphone 22 and the loud speaker 24. The secondary switching device 32 and the light source 18 are supplied with power from the battery 28 only via a switch 36 which is controlled by the primary switching device 30. Another switch 38 is controlled by the secondary switching device 32 and serves for switching the light source 18 on and off as long as the switch 36 is closed.

The primary switching device 30 has only a very low power consumption so that the load on the battery 28 is low. Only when the hand bag is open and light enters into the interior of the hand bag, the primary switching device 30 causes the switch 36 to close, so that power is supplied also to the secondary switching device 32. When, then, the user speaks a suitable code word such that it is audible, the sound signal is captured by the microphone 22 and analysed in the speech processor 34. If the sound signal is actually the pre-defined code word, then the secondary switching device 32 closes the switch 38, whereby the light source 18 is switched on.

The speech processor 34 may be programmed such that it also generates a short answer text which is output via the loud speaker 24 as spoken speech.

Optionally, the secondary switching device 32 may be configured such that the light source 18 is switched off again by entering the same code word or a second code word.

Otherwise, the light source 18 is switched on when the state sensor 20 detects that the hand bag has been closed again. In that case, the primary switching device 30 opens the switch 36, whereby the power supply for the secondary switching device 32 is interrupted and the signal that has held the switch 38 in the closed state falls off so that the switch 38 opens.

If the state sensor 20 is an environmental light sensor, it should be arranged such that it is shielded against the light from the light source 18. As an alternative, the switching device may be configured such that it modulates the light of the light source 18, e.g. by switching it off in certain intervals for a very short time period which is not perceptible by the human eye. Within this time period, the environmental light sensor can detect whether or not the bag is closed.

In other embodiments the state sensor 20 may be configured as touch sensor, proximity sensor or acceleration sensor. In the latter case the user may bring the lighting device into a state in which it is ready to be switched on for example by inserting her hand into the hand bag or by gently shaking the hand bag.

In another embodiment the state sensor 20 and the primary switching device 30 may be dispensed with entirely, and the function or at least a part of the function thereof may be taken over by the secondary switching device 32. For example, the secondary switching device may be configured such that it is normally in a sleep mode with low power consumption in which it is checked only in very short time intervals, e.g. with a clock rate of some 10 or 100 ms, whether the microphone 22 receives an acoustic signal. Only when an acoustic signal is present, the speech processor 34 will be activated in order to check whether the acoustic signal is the code word.

The code word or a set of code words may be stored permanently in the speech processor 34. In another embodiment, the speech processor 34 is configured such that it can "learn" several code words in a special training mode. In that case the lighting device may be configured individually as far as the selection of code words is concerned.

Moreover, the speech processor 34 may "learn" in this case to respond to the typical clicking noise that is produced when the hand bag is opened or closed, thereby implementing the function of the state sensor 20.

In a simplified embodiment the switching device may be configured such that the light is switched off automatically after the lapse of a fixed time period.

The invention claimed is:

1. Hand-held lighting device comprising:
   a light source and
   a switching device for switching the light source on and off, wherein the switching device comprises a speech processor for at least one of analysis and synthesis of spoken speech
   wherein the speech processor is configured to generate an output spoken text under certain conditions which are related to a state of the light source.

2. The lighting device according to claim 1, wherein the speech processor is configured for detecting a pre-defined code word and switching the light source on in response to recognition of the code word.

3. The lighting device according to claim 1, wherein the speech processor is configured for switching the light source off when a pre-defined code word is recognized.

4. The lighting device according to claim 1 further comprising a state sensor adapted to detect an open/close condition of a container in which the lighting device is carried.

5. The lighting device according to claim 4, wherein the switching device is configured for switching the light source off when the state sensor detects a closed condition of the container.

6. The lighting device according to claim 4, wherein the switching device is configured to activate the speech processor only when the state sensor detects an open state of the container.

7. Hand-held lighting device comprising:
   a light source and
   a switching device for switching the light source on and off, wherein the switching device comprises a speech processor for at least one of analysis and synthesis of spoken speech,
   wherein the speech processor is configured to record spoken text and to store the spoken text for the purpose of at least one of a later recognition and generation of this text.

8. The lighting device according to claim 7, wherein the speech processor is configured for detecting a pre-defined code word and switching the light source on in response to recognition of the code word.

9. The lighting device according to claim 7, wherein the speech processor is configured for switching the light source off when a pre-defined code word is recognized.

10. The lighting device according to claim 7, further comprising a state sensor adapted to detect an open/close condition of a container in which the lighting device is carried.

11. The lighting device according to claim 10, wherein the switching device is configured for switching the light source off when the state sensor detects a closed condition of the container.

12. The lighting device according to claim 10, wherein the switching device is configured to activate the speech processor only when the state sensor detects an open state of the container.

* * * * *